United States Patent [11] 3,623,984

| [72] | Inventors | Donald D. Carlos<br>Crown Point, Ind.;<br>David W. Young, Homewood, Ill. |
|---|---|---|
| [21] | Appl. No. | 753,083 |
| [22] | Filed | Aug. 16, 1968 |
| [45] | Patented | Nov. 30, 1971 |
| [73] | Assignee | Atlantic Richfield Company |

[54] STABILIZATION OF ORGANIC MATERIALS WITH PARAPHENYLENE DIAMINE DERIVATIVES
7 Claims, No Drawings

[52] U.S. Cl................................................ 252/47.5,
252/51.5, 252/51.5 A, 252/402, 252/403,
260/45.9, 260/611.5, 260/632.5
[51] Int. Cl........................................................ C10m 1/38,
C10m 1/32
[50] Field of Search.......................................... 252/47.5,
51.5, 51.5 A, 402, 403; 260/45.9, 611.5, 632.5

[56] References Cited
UNITED STATES PATENTS

| 2,402,792 | 6/1946 | Watson et al. | 252/51.5 A |
|---|---|---|---|
| 2,709,157 | 5/1955 | Hotten | 252/51.5 A |
| 3,189,650 | 6/1965 | Chenicek | 252/51.5 |
| 3,238,177 | 3/1966 | Chenicek | 252/51.5 |
| 3,451,166 | 6/1969 | Panzer | 252/47.5 |

*Primary Examiner*—Daniel E. Wyman
*Assistant Examiner*—W. J. Shine
*Attorney*—McLean, Morton and Boustead

ABSTRACT: This disclosure is directed to a class of novel compounds having excellent antioxidant properties. The disclosure also relates to the use of new paraphenylene diamine derivatives for the stabilization of organic materials which tend to deteriorate due to oxidation reactions. Typical of such organic materials are liquids such as lubricating oils, alcohols, polyphenyl ethers, etc., semisolids, exemplified by greases; and solids such as high molecular weight polymers.

STABILIZATION OF ORGANIC MATERIALS WITH PARAPHENYLENE DIAMINE DERIVATIVES

This invention relates to new paraphenylene diamine derivatives. The invention also relates to the stabilization of organic materials which tend to oxidatively deteriorate in storage or in use, by the addition to such materials of the diamine derivative of this invention.

Typical organic materials which tend to deteriorate due to undesirable oxidative reactions are organic liquids such as mineral and synthetic ester lubricating oils, ethers, etc.; organic semisolids as exemplified by mineral oil and synthetic ester-based greases; and organic solids such as high molecular weight polymers. Antioxidants which are known to be useful in retarding such deterioration include the various compounds possessing oxidation inhibiting qualities such as mercapto alkanoic acids; substituted phenols; alkylated aromatic amines, etc.

When unaugmented by such antioxidants, various organic compounds tend, during storage or in use, to deteriorate due to oxidation reactions between the compounds and oxygen in the atmosphere. The oxygen may, for instance, cause liquid organic compounds to undergo a change in viscosity, either an increase or a decrease, depending upon the fluid. The oxidized organic compounds may also become corrosive to metals and, in the case of lubricating oils and greases, this condition may limit the kind of metal that may be used in contact with the lubricant as otherwise there may be resultant failure or troublesome operation of such metal parts. The deposition of sludge is another condition that may arise when the organic materials are subjected to oxidative degradation. Further, the oxidation process is usually accelerated by elevated temperatures such as occur in internal combustion engines. When such organic compositions are used as motor or machinery lubricants, their stability may be still further drastically reduced due to their contact with metal surfaces which give up metallic particles to the lubricant. Such abraded or dissolved metals or metal salts appear to act as oxidation catalysts in the lubricant, causing the formation of primary oxidation products which, in turn, may lead to further degradation of the organic compounds present in the composition. In addition, water can promote corrosion of metallic surfaces and accentuate oxidation of the lubricant. Also, liquid and solid organic polymers tend to decompose under the influence of oxygen. In many cases, decrease in molecular weight of the polymers, as well as noticeable changes in odor and clarity, can result from the action of oxygen on the polymers. Among the organic compounds which particularly require stabilization against oxidative deterioration when in storage or use are those synthetic or natural rubbers wherein changes such as further polymerization or degradation occur on exposure to air and, consequently which yield, on vulcanization inferior products.

According to the present invention there is provided a class of novel compounds which exhibit excellent antioxidant properties when included in organic materials which are susceptible to oxidative degradation. The novel additives of the present invention are p-phenylene diamine derivatives. These additives are very effective in preventing oxidative deterioration of various organic substances, such as those disclosed above, particularly of rubber and polyethylene or other essentially hydrocarbon polymers. The p-phenylene diamine derivatives of the present invention are represented by the general structural formula:

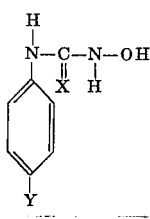

wherein X is sulfur or oxygen, and Y is selected from the group consisting of

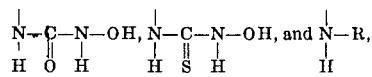

wherein R is hydrogen, hydrocarbyl (e.g. alkyl, aryl, alkaryl, and aralkyl) of up to about 24, preferably about three to 12, carbon atoms, or acyl

wherein R' is hydrocarbyl (e.g. alkyl, aryl, alkaryl and aralkyl) of up to about 24, preferably about one to 12, carbon atoms, e.g., ethyl (wherein the acyl group is acetyl), phenyl (wherein the acyl group is benzoyl), stearic (wherein the acyl group is stearoyl) etc. Preferably the R and R' groups do not contain olefinic or acetylenic unsaturation.

A preferred method of preparing the novel products of this invention is to neutralize hydroxylamine hydrochloride with an equivalent amount of sodium hydroxide in water, then the solution in stoichiometric excess is reacted with the p-phenyl diisocyanate in dioxane. The resulting solid product is washed with ice water and dried under vacuum. The phenyl diisocyanate in dioxane is added dropwise at room temperature to the hydroxylamine solution. It is to be understood that there can be substituted for the diisocyanate, other substituted phenyl diisocyanates, phenyl isocyanate, phenyl dithiocyanate, and phenyl thiocyanate reactants disclosed herein to obtain the novel compounds of this invention.

According to this invention organic materials are stabilized by the addition of a minor, oxidation-inhibiting amount of the novel paraphenylene derivatives. Often this amount is about 0.01 to 10 weight-percent of the composition, preferably about 0.05 to 5 weight-percent. The organic materials which can be stabilized in accordance with the present invention are the various nonvolatile organic substances which tend to deteriorate in storage or use due to oxidation. Solid, semisolid, and viscous liquid organic materials, especially synthetic rubbers, lubricating greases, high molecular weight polymers, resins, and viscous organic liquids are among those stabilized against oxidation by incorporating therein small amounts of a p-phenylene diamine derivative of the present invention. The term "nonvolatile" is used herein to designate those materials having a boiling point or subliming temperature at ordinary pressure, of above about 100° F. Where the additive is insoluble in the material to be stabilized, it is preferred that the material not have a boiling point or subliming temperature of above about 250° C. Some products that are subject to the adverse effects of oxidation and can be used in this invention, include oils, fats, rubbers, greases, foodstuffs, polyethylene, polyisobutylene, polypropylene, wax hormones, vitamins, butadiene-styrene copolymers, soaps, insecticides and resins. Such oxidative effects result in the formation of materials which cause, for example, discoloration, undesirable changes in odor, taste and gum formation.

In one preferred embodiment of the present invention, the antioxidant may be used in lubricating oil compositions. Lubricating oils which can serve as the base oil or major component of the lubricating oil compositions of the present invention include a wide variety of oils of lubricating viscosity, such as naphthenic base, paraffinic base, and mixed base mineral lubricating oils; other hydrocarbon lubricants, e.g., lubricating oils derived from coal products; and synthetic oils, e.g., alkylene polymers (such as polymers or propylene, butylene, etc., and mixtures thereof), alkylene oxide-type polymers (e.g. alkylene oxide polymers prepared by polymerizing the alkylene oxide, e.g., propylene oxide, etc., in the presence of water or alcohols, e.g., ethyl alcohol), carboxylic acid esters (e.g., those which are prepared by esterifying such dicarboxylic acids as adipic acid, azeloic acid, suberic acid, sebacic acid, alkyl succinic acids, fumaric acid, maleic acid, etc., with alcohols such as butyl alcohol, hexyl alcohol, 2-ethylhexyl alcohol, dodecyl alcohol, etc.). The above base oils can be used individually or in combinations thereof, whenever miscible or whenever made so by the use of mutual solvents.

Greases which can be employed with the novel additive combination of this invention can be a lubricating oil base stock, thickened to grease consistency with a soap, for instance, a lithium soap of the saturated or unsaturated soap-forming fatty acid of about 12 to 20 carbon atoms. Highly preferred soaps are those of the soap-forming hydroxy fatty acids, e.g. 1,3; stearic acid, and 2,3esters and glycerides, such as hydrogenated castor oil. The amount of soap employed is that amount sufficient to thicken the base oil to grease consistency, and this amount is generally about 5 to 50 percent, based on the weight of the base oil. The base oils thickened to grease consistency are of lubricating viscosity and can be petroleum lubricating oils derived from paraffinic, naphthenic, asphaltic or mixed base crudes. The oils may also be synthetic such as synthetic ester oils, e.g., di-2-ethylhexyl sebacate. The stabilized greases of this invention can also contain other additives such as extreme pressure agents, corrosion inhibitors and antioxidants.

Other materials which are aided by the antioxidant of the present invention include normally solid, semisold or liquid polymers, which may be natural of synthetic, e.g., natural and synthetic rubbers such as styrene-butadiene copolymers; polyolefins such as polyethylene, polypropylene, polyisobutylene, polymers and copolymers of various substituted or unsubstituted diolefins (preferably conjugated) having say, four to about six carbon atoms, e.g., butadiene-1,3; isoprene; 2,3-dimentyl-butadiene-1,3; 2-chlorobutadiene; cyclopentadiene; pentadiene-1,3; and the like. The latter copolymers may, for instance, be formed from a major portion of the polymerizable diolefins with a minor proportion of other olefinic compounds such as vinyl ketones, diethyl fumarate, styrene, vinyl napthalenes, methacrylonitrile, and the like.

Other organic compounds which can be stabilized in accordance with the invention include oxygen-containing materials such as alcohols, ethers, ketones, aldeydes, etc., which are nonvolatile and which are likely to deteriorate by oxidation on storage or in use. These compounds will often contain hydrocarbon chain groups of at least five carbon atoms, for example, isooctyl alcohol and polyphenyl-ethers, preferably diphenyl ethers such as bis(phenoxyphenyl) ether. Frequently, the oxidative degradation of the above materials will be enhanced when these materials include, or are used in the presence of, certain metals.

Materials such as rubber, plastic and grease, for example, are often formed with metals and/or used on metals such as iron, steel, copper, manganese, nickel, etc. Elastomers, for instance, such as natural rubber, polyisobutylene, polyethylene, polypropylene, etc., are even more susceptible to oxidative degradation if such metals are in the products or if the metals are in contact with the products. The paraphenylene diamine derivatives of this invention can also have metal-deactivating properties and therefore exhibit their antioxidant effect even when the metals are present in the materials sought to be stabilized. The amount by weight of antioxidant used in this regard is about 0.1 to 1 weight-percent and preferably in the range of about 0.3 to 0.7 percent by weight. Thus the paraphenylene diamine derivatives of this invention can also be used as interfacial agents and complexing agents for metals.

The invention will be better understood by reference to the following examples

EXAMPLE I

Six-tenths (0.6) mole of hydroxylamine hydrochloride (41.7 g.) was neutralized with 0.6 mole of sodium hydroxide (24 g.) in 50 ml. of water. The resultant solution was placed in a 511 ml. flask, and 0.1 mole of p-phenyldiisocyanate (16 g.) in 70 ml. dioxane was added dropwise over 2 hours. The resulting yellow solid product N, N'-bis-(formohydroxamino)-p-phenylene diamine

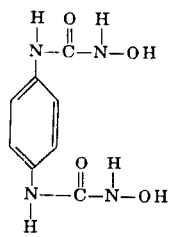

was washed with ice water and dried under vacuum. A yield of 94.7 percent product was recovered.

The above product was tested for antioxidant effects in Haeveacrumb SMR 5L, a Malaysian natural rubber in crumb, i.e. particulate, form. The rubber is reported as having the following properties:

| | |
|---|---|
| Dirt Content, % | 0.05 |
| Ash Content, % | 0.05 |
| Copper Content, p.p.m. | 8 |
| Manganese Content, p.p.m. | 10 |
| Nitrogen Content, % | 0.7 |
| Volatile Content, % | 1.0 |

A sample of the rubber was worked for 2 minutes on each of a Banbury mill and a micro mill, respectively, at 50° C., and then air-aged in a standard ASTM circulating oven at 120° F. with samples being removed and evaluated after 12 and 32 days. A second portion of the rubber containing the phenylene diamine derivative of this example was also air-aged in the same manner. In preparing this second sample, the antioxidant was weighed, ground up, and mixed with the particulate rubber before air-aging. Table I below indicates the extent of gelling after air aging for 12 and 32 days respectively, of the above samples, as well as that of the same rubber-containing 2,6-ditertiary butyl methyl phenol. The percentage of gelling is directly proportional to the amount of deterioration of the rubber. The gelling effect is the result of cross-linkage due in part to oxidation. Rubber with a high percent of gel will not process, cure, or extrude well, and is not generally as good a quality rubber as that with a low gel percent.

TABLE I.—ANTIOXIDANTS IN NATURAL RUBBER

| Weight percent antioxidant | Name of antioxidant | Percent gel after — 12 days | 32 days |
|---|---|---|---|
| 0 | None | 28.60 | 40.70 |
| 0.5 | 2,6-ditertiary butyl methyl phenol. | 25.10 | 29.90 |
| 0.5 | [structure: H–N–O / ‖ / C—NHOH on phenylene ring with N–C(=O)—NHOH, H] | 10.10 | 17.80 |

EXAMPLE II

The paraphenylene diamine derivative of example I was also tested as an antioxidant in rubbery polyisobutylene. The results of these tests, including control results, as regards the molecular weight decrease which is indicative of oxidation instability, are given in table II. The antioxidants were compounded in rubbery polyisobutylene on a micro rubber mill at 70° C. for 2 minutes. Polymer was then cut into ¼-inch sections and placed in an ASTM air oven and aged for 10 days at 110° C. The stabilization qualities of the product of example I are evidenced in the final molecular weight results shown in Table II.

TABLE II.—ANTIOXIDANTS IN POLYISOBUTYLENE

| Weight percent antioxidant | Name of antioxidant | Original mol. weight | Final mol. weight |
|---|---|---|---|
| 0 | None | 98,000 | 22,000 |
| 0.75 | 2,6-ditertiary butyl-3-methyl phenol. | 98,000 | 74,000 |
| 0.75 | 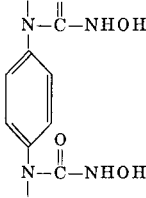 | 98,000 | 91,000 |

EXAMPLE III

A known antioxidant often used in polyethylene and natural rubber as a high-temperature antioxidant and having metal-deactivating properties is N-(n-butyl) p-hydroxybenzamide. An evaluation was made of N-(n-butyl) p-hydroxybenzamide versus the disubstituted aromatic hydroxy urea [N-N'-bis (formo hydroxamino) p-phenylene diamine] prepared in example I.

The antioxidant of example I was compounded in natural rubber in a Banbury mixer for 2 minutes In some product mixtures copper was also present, and in some mixtures N-(n-butyl) p-hydroxybenzamide was added. The results, listed in table III, show the value of the aromatic dihydroxy urea product of example I in retarding oxidation degradation as evidenced by lower gel formation after 21 days at 60° C. in a natural rubber free of metal contamination as well as in rubber containing copper acetate in amounts up to 0.25 percent.

EXAMPLE IV

The paraphenylene diamine derivative product of example I was evaluated at a weight concentration of 0.1 percent as an antioxidant in di-2-ethylhexyl-sebacate, a conventional synthetic ester lubricant. Results indicating the efficacy of this paraphenylene diamine derivative as a stabilizer in metal-containing compositions are shown in table IV below:

TABLE IV

| N,N'-bis(formo hydroxamino) p-phenylene Diamine in Synthetic Lubricating Oil—168-hour Test at 250° F. | | |
|---|---|---|
| Corrosion and Oxidation Wt. Change (mg./cm.²) | No Additive | 0.1% Additive |
| Steel | +0.01 | 0.01 |
| Aluminum alloy | +0.01 | 0.00 |
| Magnesium alloy | −0.01 | −0.01 |
| Cadmium-plated steel | +1.58 | −0.01 |
| Copper | −0.01 | 0.00 |
| Visible Corrosion | | |
| Steel | Brown | Colorless-no Visible Corrosion |
| Aluminum alloy | None | No visible corrosion |
| Cadmium-plated steel | Grey | No visible corrosion |
| Copper | Etched | No visible corrosion |
| Percent oil loss | 5.4 | 3.3 |
| Visible change at 130° F., % | 57.0 | 4.9 |
| Neutralization No. increase | 72.0 | 0.5 |
| Appearance of oil | Gummy | Clear |

TABLE III.—ANTIOXIDANT IN NATURAL RUBBER WITH METALS PRESENT

| Sample No. | Percent metal present as metal acetate | Name of metal acetate | Percent antioxidant | Name of antioxidant | Percent gel in rubber |
|---|---|---|---|---|---|
| 1 | None | None | 0.5 | N-(n-butyl) p-hydroxybenzamide | 62 |
| 2 | 0.001 | Copper acetate | 0.5 | do | 66 |
| 3 | None | None | 0.5 | 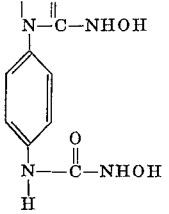 | 29 |
| 4 | 0.001 | Copper acetate | 0.5 | 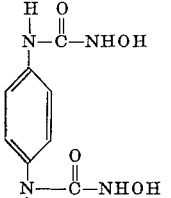 | 17 |
| 5 | 0.250 | do | 0.5 | N-(n-butyl) p-hydroxybenzamide | 40 |
| 6 | 0.250 | do | 0.5 | 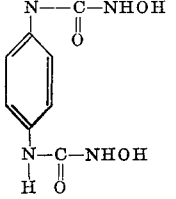 | |

EXAMPLE V

Reaction I:

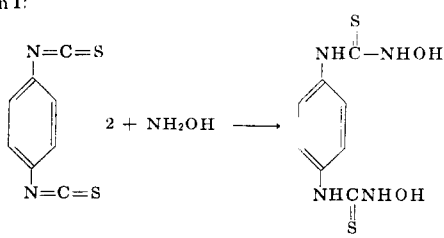

To a 500 ml. fluted, 3-neck flask containing 150cc. of 7.1 M. Aqueous NH₂OH solution is added dropwise for 2 hours a solution of the above compound, p-phenylene dithioisocyanate,

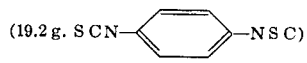

containing 0.10 mole in 70 ml. dioxane. A solid precipitates immediately and is collected by suction filtration. The product is washed with water and dried under vacuum to give a quantitative yield of the high-melting solid, N,N'-bis (formohydroxythioamino) p-phenylene diamine.

EXAMPLE VI

Reaction II:

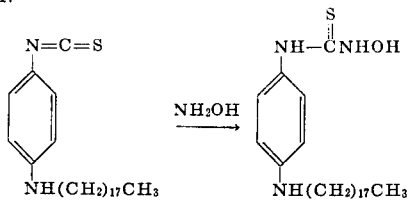

In a manner similar to example V, a solution of 38.9 g. (0.09 mole) of p-(n-octadecylamino) phenylisothisothiocyanate in 70 ml. dioxane is added dropwise for 2 hours to 150 ml. of 7.1 M hydroxylamine solution. The resulting white solid product is collected by suction filtration and vacuum-dried. The yield of said product N-(octadecylamino) N'-(formohydroxythioamino) -p-phenylene diamine, is essentially quantitative.

EXAMPLE VII

Reaction III:

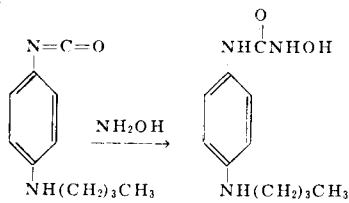

In a manner similar to example V a dioxane solution of 19.0 g. (0.10 mole) of p-(n-butylamino) phenylisocyanate is added to an excess of aqueous NH₂OH solution. The product is washed with water and dried in vacuum to give a quantitative yield of white solid N-(butylamino)-N'-(formohydroxyamino)p-phenylene diamine.

EXAMPLE VIII

Reaction IV:

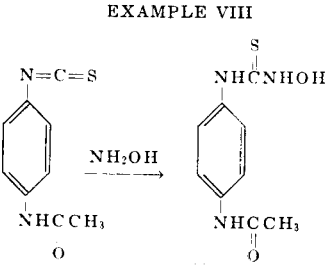

In a manner similar to example V, a solution of 19.2 g. (0.10 mole) of p-(acetamido) phenylisothiocyanate in 70 ml. dioxane is added for 2 hours dropwise to 150 ml. of 7.1 M NH₂OH solution. The product is filtered, washed with water, and vacuum-dried. There is obtained a quantitative yield of white product, N-(acetamido)-N'-(formo hydroxythioamino)-p-phenylene diamine.

EXAMPLE IX

Reaction V:

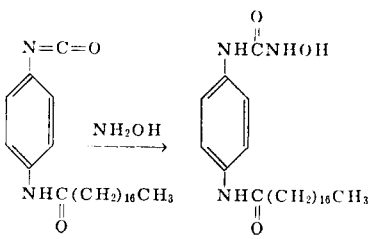

In a manner similar to example V, a solution of 40.1 g. (0.10 mole) of p-(stearamido) phenylisocyanate in 70 ml. dioxane is added dropwise to 150 ml. of 7.1 M hydroxylamine solution. The product is filtered, washed and dried in vacuum. There results an essentially quantitative yield of the product, N-(stearamido)-N'-(formo hydroxyamino)-p-phenylene diamine.

The products of examples V–IX can be used in lieu of N, N'-bis-(formo hydroxyamino) p-phenylene diamine in the aforementioned compositions, for instance, in the material and synthetic rubbers and synthetic ester lubricants of examples I to IV.

We claim:

1. An organic material which is susceptible to oxidative deterioration selected from the group consisting of mineral and synthetic oils, greases, oxygen-containing compounds of at least five carbon atoms and essentially hydrocarbon polymers, containing as an antioxidant a compound having the formula:

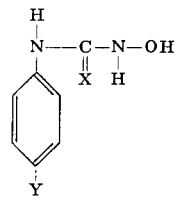

wherein X is sulfur or oxygen, and Y is selected from the group consisting of

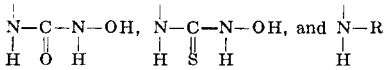

wherein R is hydrogen, hydrocarbyl of up to about 24 carbon atoms, or acyl of up to about 24 carbon atoms in an amount sufficient to inhibit oxidation of said organic material.

2. The organic composition of claim 1 wherein said antioxidant is N,N'-bis-(formo hydroxythioamino)-p-phenylene diamine.

3. The organic composition of claim 1 wherein said antioxidant is N-(octadecylamino)-N'-(formo hydroxythioamino)-p-phenylene diamine.

4. The organic composition of claim 1 wherein said antioxidant is N-(butylamino)-N'-(formo hydroxyamino)-p-phenylene diamine.

5. The organic composition of claim 1 wherein said antioxidant is N-(acetamido)-N'-(formo hydroxythioamino)-p-phenylene diamine.

6. The organic composition of claim 1 wherein said antioxidant is N-(stearamido)-N'-(formo hydroxyamino)-p-phenylene diamine.

7. The organic composition of claim 1 wherein said antioxidant is N,N'-bis-(formo hydroxamino)-p-phenylene diamine.

* * * * *

UNITED STATES PATENT OFFICE
CERTIFICATE OF CORRECTION

Patent No. 3,623,984     Dated November 30, 1971

Inventor(s) Doland D. Carlos, and David W. Young

It is certified that error appears in the above-identified patent and that said Letters Patent are hereby corrected as shown below:

Column 2, Line 65, "polymers or propylene" should read --polymers of propylene--

Column 2, Line 71, "azeloic acid" should read --azelaic acid--

Column 3, Line 9, "1,3; stearic acid, and 2.3" should read --12-hydroxy stearic acid, and their simple--

Column 4, Table I, " 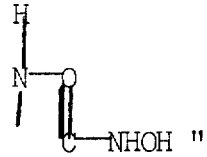 should read -- 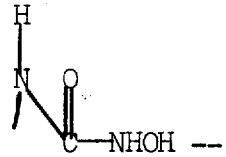 --

Table III, Sample 6 under the Column "Percent gel in rubber" insert --9--.

Column 7, Example V, "2 + NH₂OH" should read --+ 2 NH$_2$OH--

Column 8, Line 62, "about 24 carbon" should read --about 25 carbon--

Signed and sealed this 16th day of May 1972.

(SEAL)
Attest:

EDWARD M.FLETCHER,JR.          ROBERT GOTTSCHALK
Attesting Officer              Commissioner of Patents